March 11, 1924. 1,486,175
W. G. WILSON
VALVE CONSTRUCTION
Filed March 3, 1920 9 Sheets-Sheet 1
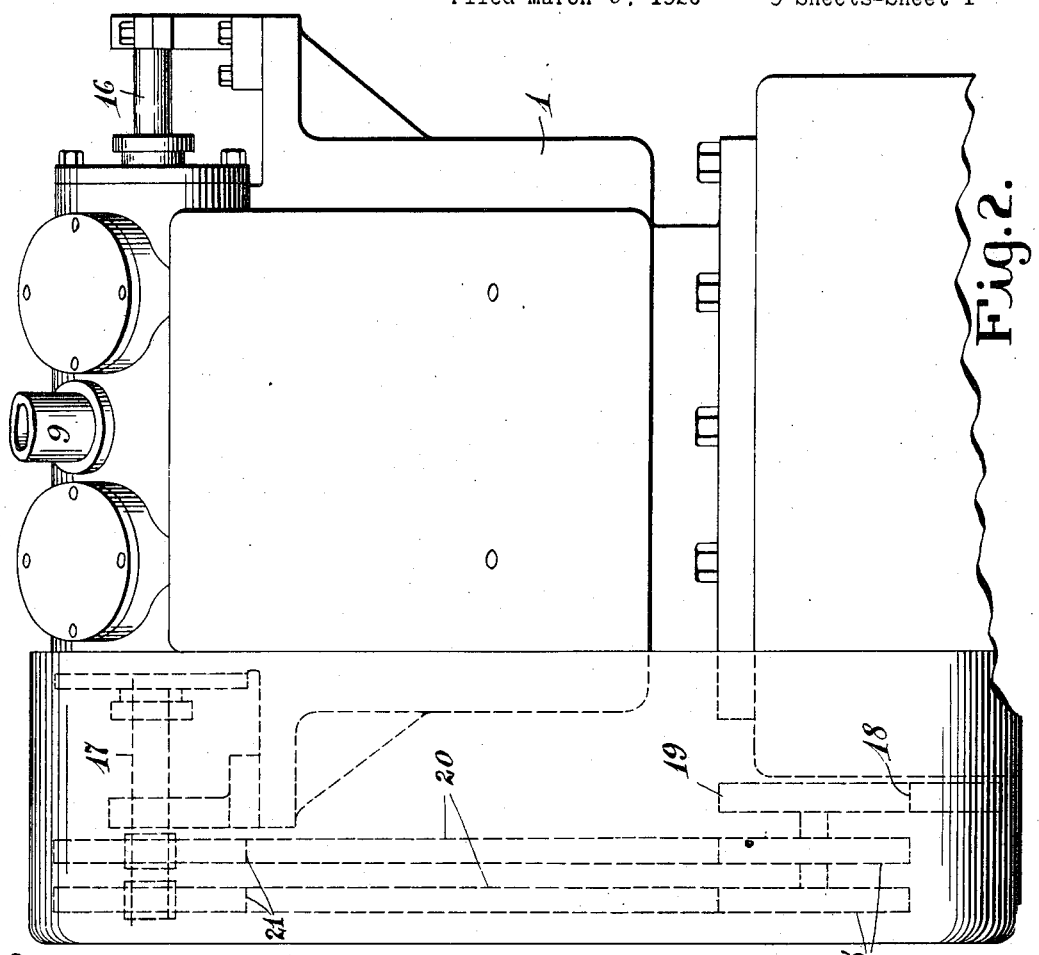
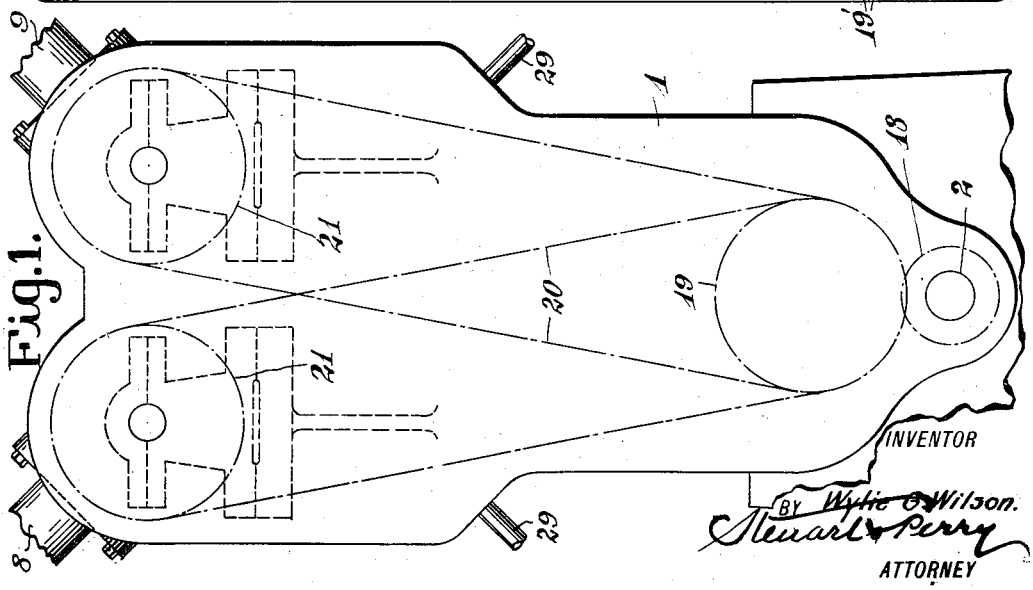
INVENTOR
BY Wylie G. Wilson.
Stewart Perry
ATTORNEY

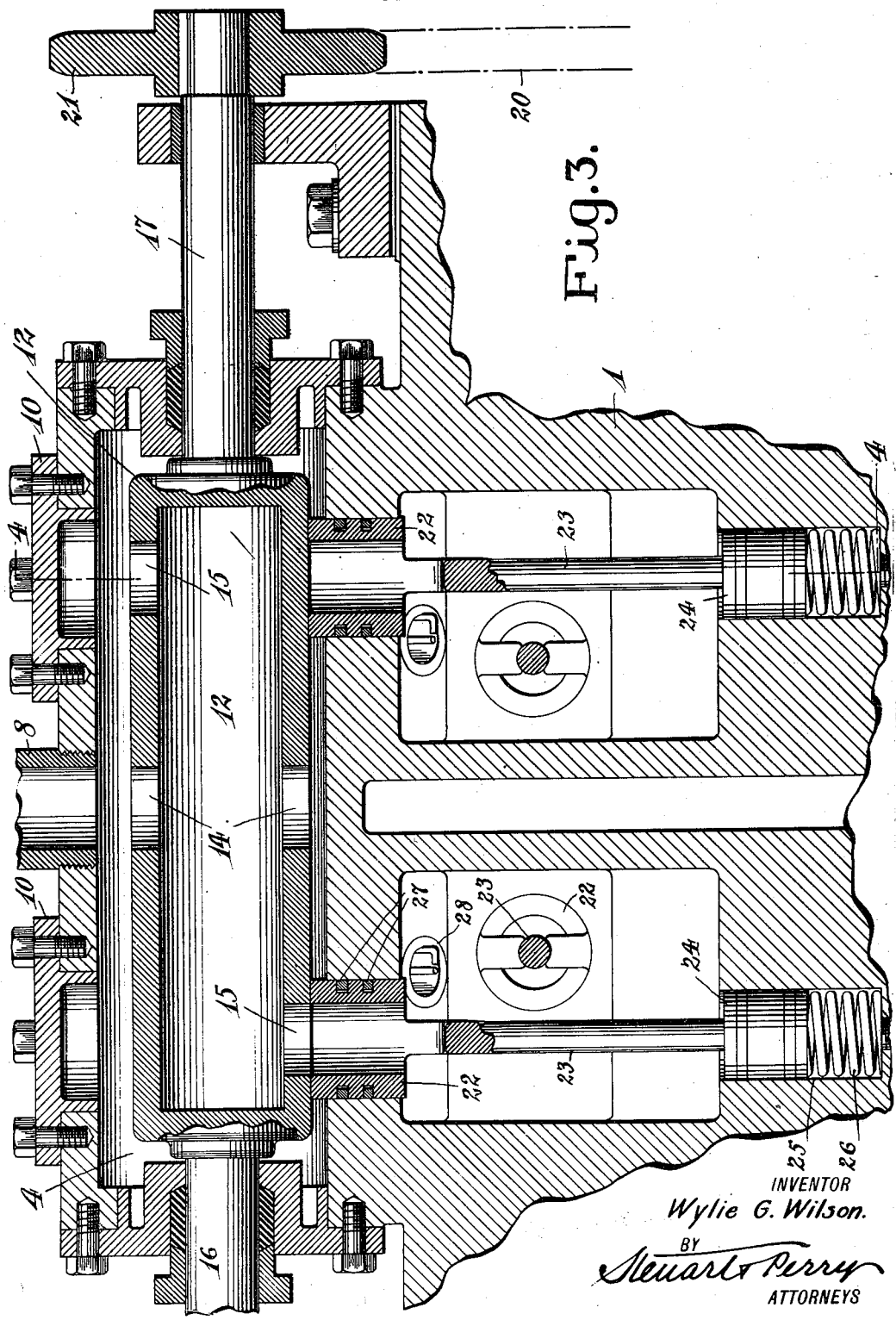

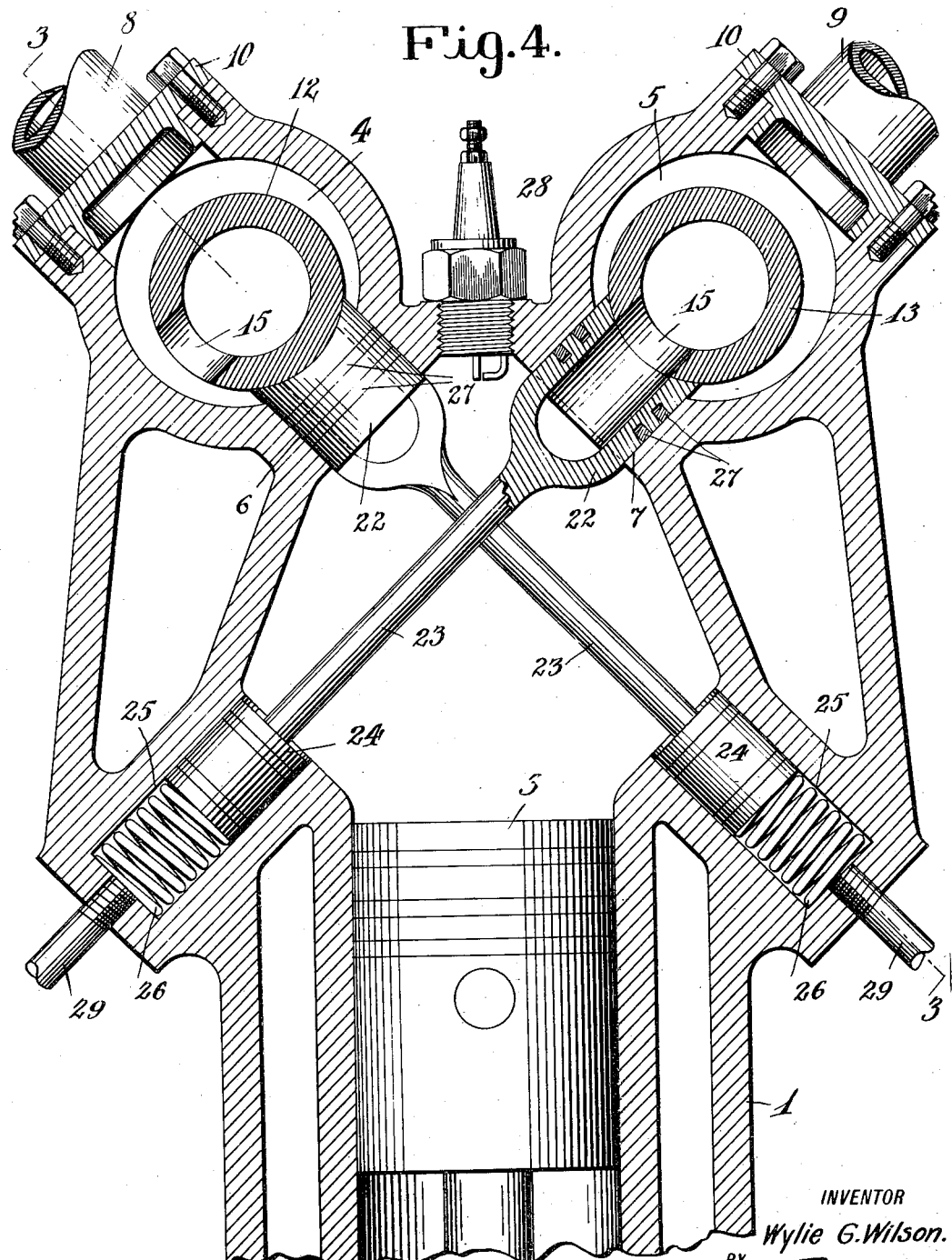

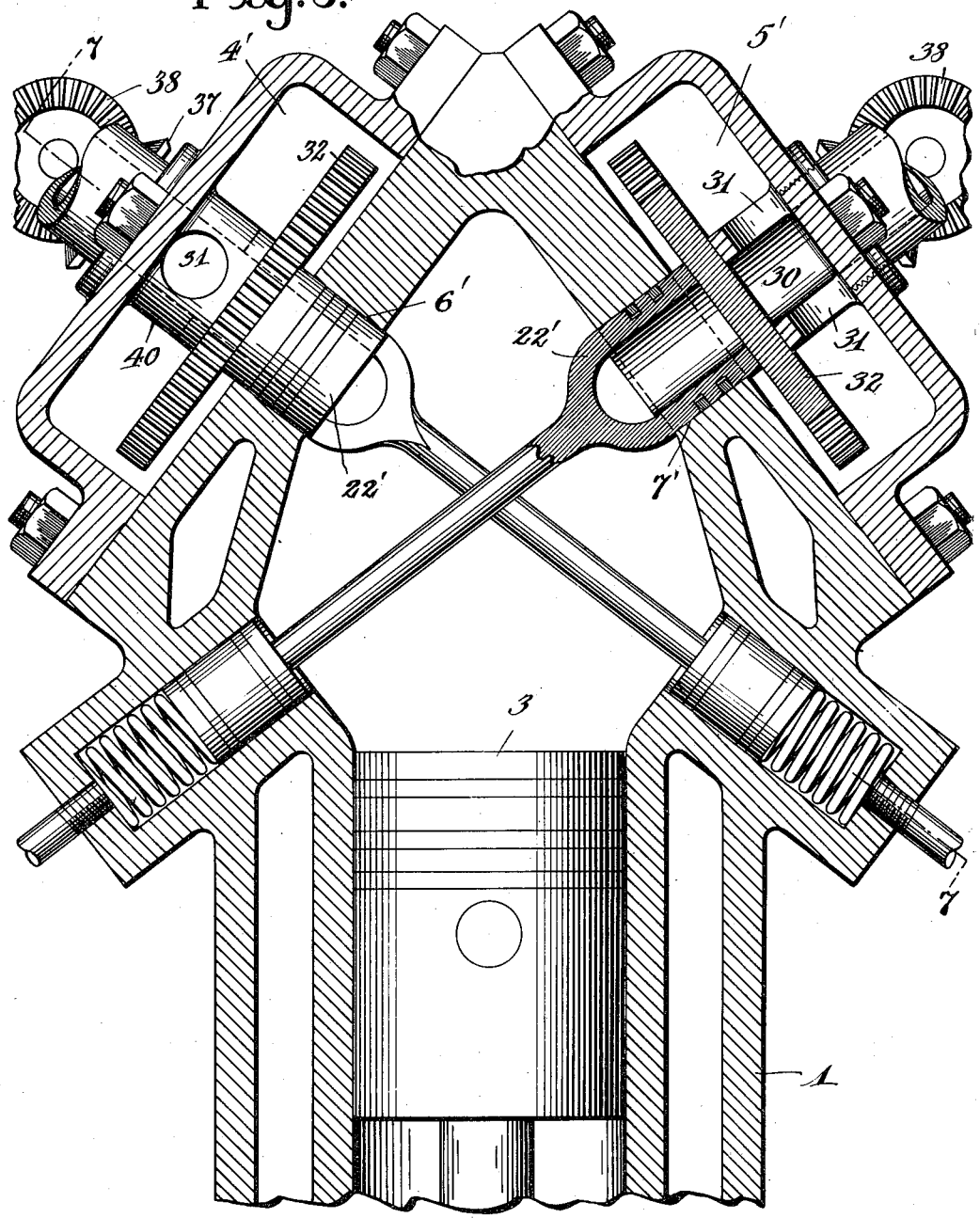

March 11, 1924.

W. G. WILSON

VALVE CONSTRUCTION

Filed March 3, 1920      9 Sheets-Sheet 5

1,486,175

INVENTOR
Wylie G. Wilson.
BY
Stewart & Perry
ATTORNEYS

March 11, 1924.
W. G. WILSON
VALVE CONSTRUCTION
Filed March 3, 1920
1,486,175
9 Sheets-Sheet 6
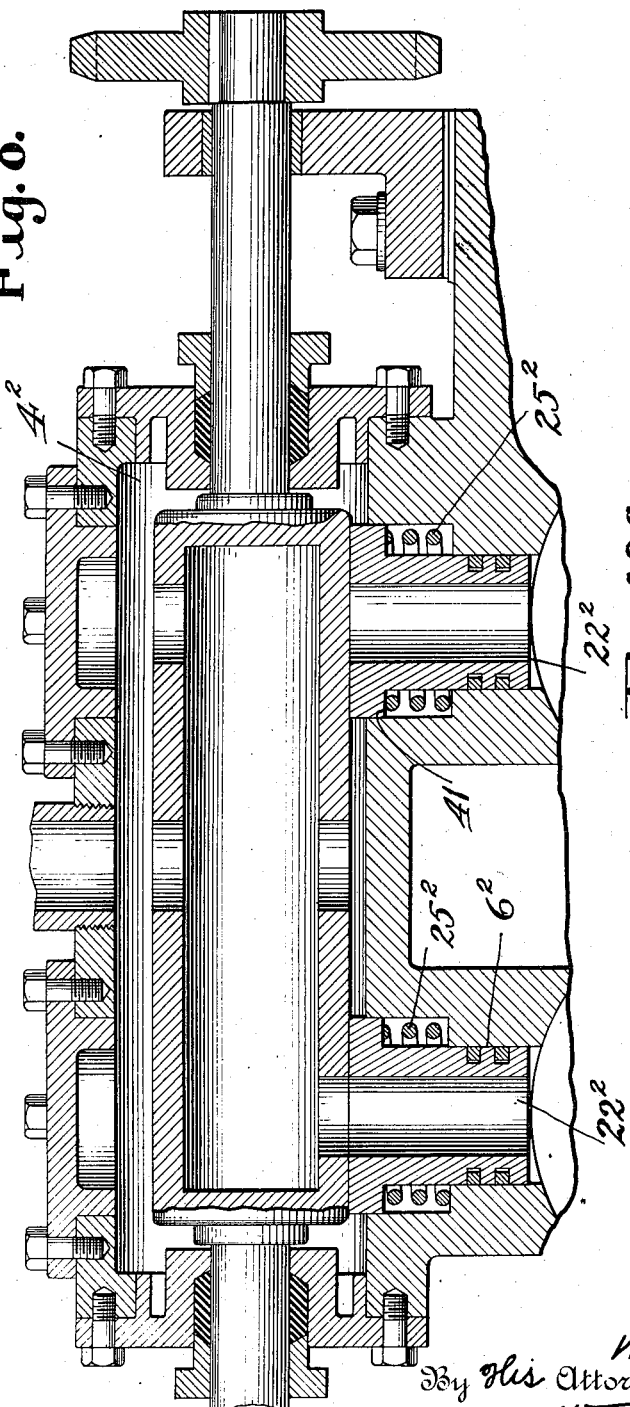
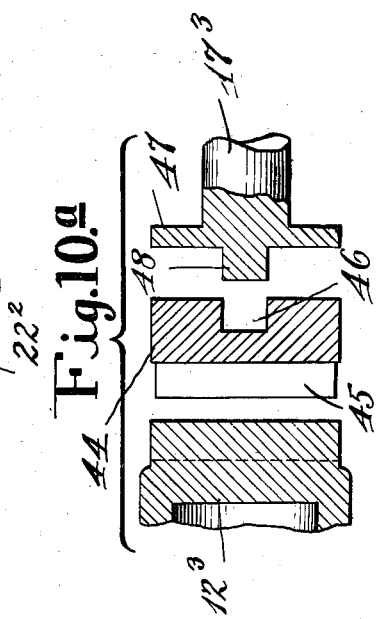
Inventor
Wylie G. Wilson
By His Attorneys
Stewart Perry March 11, 1924. 1,486,175
W. G. WILSON
VALVE CONSTRUCTION
Filed March 3, 1920 9 Sheets-Sheet 7

Inventor
Wylie G. Wilson
By His Attorneys
Stuart Perry

March 11, 1924.

W. G. WILSON

VALVE CONSTRUCTION

Filed March 3, 1920

Inventor
Wylie G. Wilson
By His Attorneys
Stuart L Perry

Patented Mar. 11, 1924.

1,486,175

UNITED STATES PATENT OFFICE.

WYLIE GEMMEL WILSON, OF NEW YORK, N. Y., ASSIGNOR TO SLIDING VALVES, INCORPORATED, A CORPORATION OF DELAWARE.

VALVE CONSTRUCTION.

Application filed March 3, 1920. Serial No. 362,982.

*To all whom it may concern:*

Be it known that I, WYLIE GEMMEL WILSON, a subject of the King of Great Britain, and a resident of New York city, in the county of New York and State of New York, have invented certain new and useful Improvements in Valve Constructions, of which the following is a specification.

This invention relates to valves for engines and, while of particular advantage in connection with internal combustion engines, it is adaptable to steam engines, air compressors, etc.

The invention relates, more particularly, to that type of valve in which a sealing member, in the form of a barrel, plug or sleeve, rotates or reciprocates and thus controls the inlet of motive fuel to the engine cylinder, and the exit of exhaust gases from said cylinder.

Many attempts have been made to make a valve of this character, but while some of them gave promise of good results in an experimental way none of them have stood the test of extended, practical operation. This is for the reason that, in all prior valves embodying rotary barrels, these sealing members have been made to tightly fit the chambers in which they rotate and this tightly fitting rotary engagement is relied upon to form a seal of some kind, usually to preclude leakage of compression. To accomplish this the barrel necessarily runs in close contact with the chamber in which it is housed and, as a result of the changes in temperature, due to operation conditions of the engine, the barrel is subject to expansion or shrinkage so that the seal is either broken if the barrel is shrunk, or the barrel binds on the walls of its chamber when it expands. It will be apparent, from the conditions of operation specified, that the proper operation of a barrel, which runs in contact with the chamber walls which surround it, is practically impossible. Moreover, it is exceedingly difficult to even initially produce a tight seal between the barrel and its chamber walls because of the extended, inaccessible and curved surface of both parts.

The present invention obviates the disadvantages adverted to, and others, in that it embodies a structure wherein a rotating or rocking or reciprocating sealing member is employed which does not contact or engage with the walls of the chamber in which it operates. In other words, the movable sealing member of this invention is so mounted within the chamber which houses it that, to all intents and purposes, it is without contact with the walls of said chamber at any point and especially without contact with said walls at any point of its sealing face. Said sealing member may be mounted so as to be entirely "floating" or may be provided with a reduced trunnion on one or both ends, which trunnion or trunnions may be supported for rotation in the walls of the housing casing. It is not essential, however, to have these bearings fit tightly, as they do not perform the function of a seal. In practice, the seal bearings are obtained by the employment of a gland with soft packing. As a result of this construction, the face of the sealing member rotates free of all metallic contact so far as the enclosing chamber is concerned. It is manifest, therefore, that expansion or contraction of the sealing member will in nowise effect its proper operation or cause binding or leakage.

From a more specific standpoint, the invention as related to internal combustion engines, in its preferred, practical form embodies two chambers, one of which is associated with a source of motive fuel and may be termed the inlet chamber, and the other of which is in communication with the exhaust and may be termed the exhaust chamber. Each of these chambers has communication with the several cylinders of the engine, but such communication is normally cut off by means of one or more rotary sealing members of either the rotary barrel or rotary disk type, which are preferably synchronized with the movements of the crank shaft through appropriate gearing, chain connection or otherwise. Associated with the valves are sleeves which, in the preferred embodiment of the invention, are elastically or yieldingly held by springs, or pneumatic means, in engagement with the associated rotary sealing member to form a tight seal with said sealing member to preclude leakage of compression. Moreover, I may provide each sleeve with means for substantially balancing said sleeves against the pressure in the cylinder, thereby avoiding undue wear and other disadvantages incident to excessive friction. As the crank shaft is operated by the pistons of the respective cylinders of the engine, the sealing members rotate synchronously therewith and the inlet and exhaust chambers are successively brought, through the passages in said sleeves, into communication with the respective cylinders in timed sequence.

While I preferably employ substantially or partially counterbalanced sleeves to effect communication between the inlet chamber and the power chamber and the exhaust chamber and the power chamber, these sleeves may partake of any channeled member construction and need not, necessarily, be of the specific sleeve form referred to. Moreover, these channeled members may be either counterbalanced or not, as desired. The invention further contemplates a construction wherein each rotary sealing member is adapted to cooperate with passages or ports formed directly in walls of the power chamber, thereby dispensing with the channeled members for effecting communication between the inlet or exhaust chambers and the power chamber. When this construction is employed, the sealing member is elastically held in cooperative relation with the passages or ports, so that expansion or contraction of the parts will not effect the efficiency of the seal or cause binding. While this latter construction may be employed in internal combustion engines, it is particularly applicable for use in steam engines or air compressors, or such machines in which the pressure of the operating fluid is practically equal to, or greater than, the normal pressure in the power chamber. It will thus appear that, in accordance with this invention, the seat or seats for the rotary sealing member may be elastically held in engagement with the rotary sealing member, or, conversely, the seats may be fixed and the rotary sealing member may be held to said seats by elastic pressure. This feature of elastic pressure, as applied to rotary valve construction, is a distinct departure from prior practice, and, as will be manifest, it entirely overcomes binding of the parts, thereby obviating undue wear and friction, and yet maintains the efficiency of the valve seal. Simplicity in construction and durability of operation as well as efficiency in rotary valve operation is thus obtained.

Features of the invention, other than those specified, will be apparent from the hereinafter detailed description taken in conjunction with the accompanying drawings.

In the accompanying drawings, I have illustrated different practical embodiments of the invention, but the constructions therein shown are to be understood as illustrative, only, and not as defining the limits of the invention.

Figure 1 is an end elevation of a two cylinder internal combustion engine embodying the present invention.

Figure 2 is a side elevation of the engine shown in Figure 1.

Figure 3 is a section on the line 3—3 of Figure 4.

Figure 4 is a section on the line 4—4 of Figure 3.

Figure 5 is a section corresponding to Figure 4, but illustrating a modified form of the invention.

Figure 8 is a section corresponding to Figure 3 through an engine, showing the modified form of valve arrangement.

Figure 10a shows certain details of construction employed in the construction of Figure 10; and, Figure 11 is a section corresponding to Figure 9, showing valve arrangements of the types illustrated in Figures 8 and 10 incorporated in a single machine.

Figure 6:
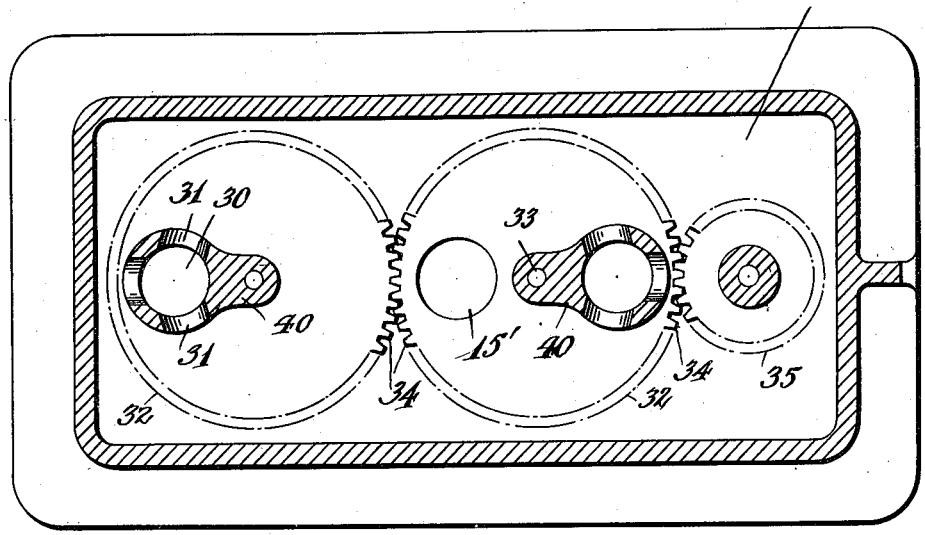
Figure 6 is a section on the line 6—6 of Figure 7.

Referring to the drawings, 1 designates an internal combustion engine which, for the purpose of illustration is shown as a two cylinder gasoline motor. The motor is provided with the usual crank shaft 2, with which is associated conventional pistons 3. Different forms of the invention are shown in the drawings, but in every instance illustrated they are of the "Valve-in-head" type and while the invention might be readily adapted to either the L or T head style of motor, the form shown is preferred.

Referring first to the construction shown in Figures 1 to 4 inclusive, the upper portion of the cylinder casting is provided with two chambers 4 and 5 which extend in parallel relation longitudinally of the casting and are positioned one on either side of the medial line of the engine. The chambers 4 and 5 are shown as circular in cross section, but, in practice, they may be of any shape. The chambers 4 and 5 are provided with communicating openings 6 and 7, respectively, leading from said chambers into the engine cylinder at a point above the uppermost travel of the piston 3 so as to allow of the entrance of motive fuel from the chamber 4 into the engine cylinder through the opening 6 and the exit of waste products of combustion through the opening 7 into the exhaust chamber 5. Carbureted fuel is fed to the chamber 4 through a pipe 8 leading from a suitable source of fuel supply, such as a carburetter, while pipe 9 serves as an outlet to the exhaust.

Extending longitudinally through each of the chambers 4 and 5 are rotary barrels 12 and 13 which may be either solid or hollow as shown. When the hollow barrel is employed, its interior is in constant communication with the interior of the chamber which houses it by providing the barrel with ports 14, and additional ports 15 are provided which are adapted to be brought, through rotation of the barrels, into alinement successively with the openings 6 and 7 leading into the cylinder.

Both barrels are mounted in the same manner and the mounting of the intake barrel is best shown in Figure 3 of the drawings. It will be noted that it is free for its entire length from engagement with the wall of the chamber in which it is housed, and is journalled for rotation on projecting stub shafts 16 and 17. The shafts 16 and 17 project through the opposite ends of the chamber 4 and are journalled for rotation in glands provided with soft packing as shown so as to preclude leakage but provide for proper rotation of the barrel. Both barrels are rotated at a uniform speed in synchronism with the crank shaft and are accordingly provided with suitable driving connections with the latter. The connections shown may be of any desired type but, as illustrated, are of the sprocket chain type. A gear 18, fixed on the crank shaft, drives a gear 19 which serves to actuate gears 19' and sprocket chains 20 leading upwardly and about sprocket wheels 21, one of which is fixed on the stub shaft of each rotary barrel. The gearing connections are such that the rotation of both barrels will be properly timed with the movements of the pistons.

Instead of having the rotary barrel cooperate directly with rigid ports leading to the engine cylinder as heretofore, the barrels are, as already stated, spaced from the walls of the chambers in which they are enclosed, and in each of the openings 6 and 7, which open communication between said chambers and the engine cylinder, are positioned adjustable sleeves 22, which may be introduced into position through openings in the casting which are normally closed by plates 10 bolted in position thereon. These sleeves are hollow and are mounted within the respective openings so as to be free for longitudinal sliding movement or adjustment therein. Each sleeve is provided with a stem 23 to the opposite end of which is secured a balancing piston 24 which works in a pocket 25 formed in the cylinder casting. Positioned in the base of each pocket 25 and back of the piston is a spring 26 which normally forces the sleeve in a longitudinal direction and into contact with the corresponding barrel. The barrel engaging ends of the sleeves are shaped to conform with the curvature of the barrel and form a seat with the circumference thereof. Each sleeve 22 as well as each piston 24 is preferably provided with piston rings 27 to preclude leakage as will be manifest.

The engine constructed as described is fired by suitable spark plugs 28, one of which is associated with each cylinder and the engine functions in the usual manner in every respect as regards the inlet and exhaust thereof. During the rotation of the crank shaft, the rotary barrels 12 and 13 are driven through the connections described to bring the parts thereof in timed sequence into juxtaposition with the hollow inlet and exhaust sleeves 22 to place the cylinders, individually, alternately, into communication with the inlet and exhaust chambers 4 and 5. The sleeves 22 are free to move endwise and are kept in constant contact with the revolving barrel by the elastic pressure of the springs 26, in the form of the invention shown. However, the elastic pressure referred to may be accomplished by other means than the springs 26 and, if desired, this function may be fulfilled by air or gas pressure introduced into the pockets 25 back of the pistons 24, through pipes 29. During the operation of the engine, excessive pressure on the sleeves 22, which would tend to force them so tightly against the revolving barrels as to bring about excessive friction, is overcome by the balancing effect of such pressure upon the inner ends of the pistons 24 and, in practice, the pistons are made of such diameter that their exposed area will be substantially the same as the exposed area of the sleeves 22. With this construction, the pressure on each sleeve will be substantially counterbalanced by the pressure on the corresponding piston, and the pressure between the sleeve and the revolving barrel is not seriously effected by the pressure in the cylinder. This being the case the pressure between the end of each sleeve 22 and its corresponding barrel is governed entirely by the pressure of the spring 26 or equivalent means.

During the operation of the engine, leakage of compression into the inlet or exhaust chambers 4 and 5 is prevented by the piston rings on the sleeve 22. The sleeves, which are at all times maintained in engagement wih the respective barrels, have the capacity of continuously adjusting themselves to the surface of said barrels. In other words, any wear which may occur between its parts is compensated for by the springs 26 and such wear will serve to increase the efficiency of the seat instead of decreasing it as is generally the case with the rotary sealing member now employed. This eliminates the necessity of great accuracy in workmanship and produces a thoroughly practical construction which is self-adjusting. In practice, the parts are lubricated so that excessive wear will not occur, and the lubricator employed not only serves to minimize the wear but further serves to assist in the holding of compression by the piston rings 27.

As hereinbefore stated, the action of the explosion on the pistons 24 substantially balances the effect of such explosion upon the sleeves 22 but, in practice, the parts are preferably made slightly out of balance so that the explosion will serve to press the sleeve with slightly increased pressure against its rotary barrel over and above that pressure normally exerted by the spring. By arranging the balance in this fashion, it is found that, at the time when the tendency to leakage is greatest at the point of contact between the sleeves and their barrels, the resistance to leakage is also the greatest, although at no time is pressure between these parts sufficient to result in excessive friction.

Figure 7:
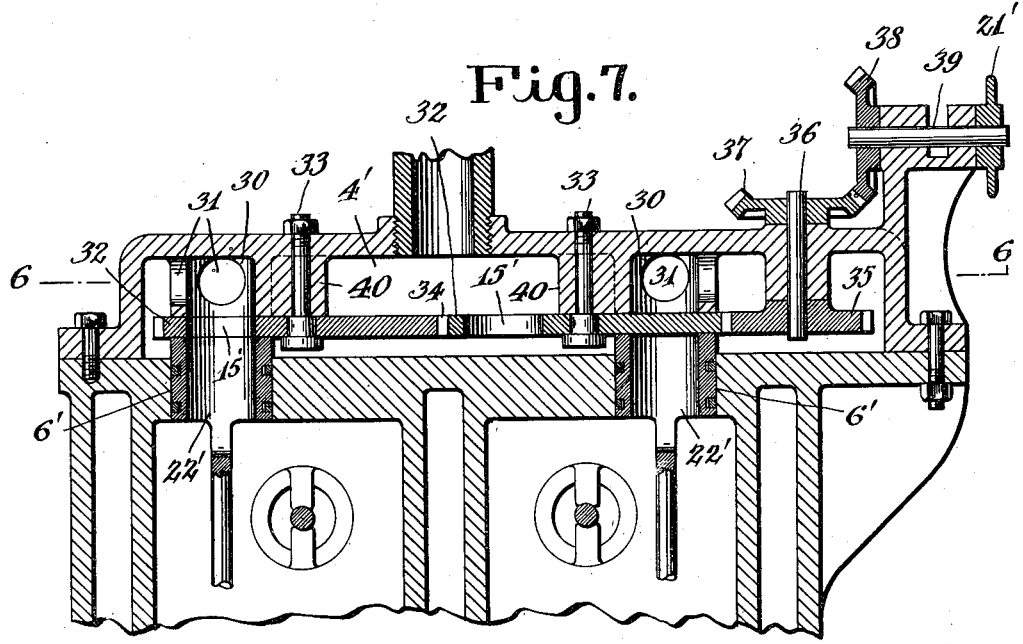
Figure 7 is a section on the line 7—7 of Figure 5.

The construction of the engine shown in Figures 5, 6 and 7 of the drawings is the same as that of the preferred embodiment hereinbefore described, but a different valve arrangement is illustrated. That is to say, instead of employing rotary barrels, common to all of the cylinders for controlling the inlet and exhaust, the inlet and exhaust to each cylinder are controlled by separate rotatable disks. In this embodiment of the invention, the chambers 4' and 5' correspond to the chambers 4 and 5, and the interior wall of each chamber is provided with an interior boss 40 cored out to form a passage 30 in alinement with apertures 6' and 7' corresponding to the apertures 6 and 7. The interior of the passages 30 are in communication with the interior of the chambers 4' and 5' through holes 31 in the walls of the bosses 40, but communication with the interior of the cylinders is normally precluded by rotatable disks 32 which are mounted for rotation on stud bolts 33 passing through the bosses 40 as shown best in Figure 7. Hollow sleeves 22' co-operate with the under surface of each disk in the same manner as the hollow sleeves 22 co-operate with the rotary barrels of the other form of construction. The disks 32 are, however, provided with ports 15' which are adapted, through the rotation of such disks to be brought into registration with the passages 30 and the interior passages of the hollow sleeves 22'. The rotation of the disks 32, in timed relation to the crank shaft, may be accomplished in any desired manner but as here shown each disk is provided at its periphery with gear teeth 34, which mesh with the corresponding gear teeth of the next adjacent disk with the result that the driving of one disk effects the simultaneous rotation of all. The disk 32 of one of the end cylinders of the engine meshes with a pinion 35 mounted on a stub shaft 36 to which is also fixed a bevel gear 37. The gear 37 meshes with a bevel gear 38 fixed on a shaft 39 carrying a sprocket wheel 21' corresponding to the sprocket 21. Sprocket 21' is driven from the crank shaft and, through the connections described, the disks are all rotated in synchronism with the reciprocation of the pistons and in timed relation to one another.

The chief structural difference between the embodiment of Figures 1 to 4 inclusive and that of Figures 5 to 7 inclusive is the form of sealing member, the preferred embodiment being that of a rotary barrel while the modified form comprises rotatable disks. In the foregoing description of the preferred form, the barrels 12 and 13 have been described as rotatable but, it will be apparent that, if desired, they might be made reciprocating to bring the ports thereof in timed sequence into or out of registration with the ducts leading to the cylinders. In both embodiments of the invention, the self adjustment of the hollow sleeves, their balanced operation and the automatic maintenance of the valve seat tight through long periods of use, clearly differentiate the present invention from all prior constructions where wear serves to destroy tight joints instead of increasing the efficiency of the seal. Moreover, neither type of construction illustrated will be effected by changes in temperature or expansion or contraction due to such changes. The valves will remain tight at all times and yet excessive wear will not result.

Looking at the present invention as thus far described, and from a broad and general standpoint, it appears that the hollow sleeve 22 constitutes what may be regarded as a valve seat, since it cooperates with the sealing member to form a seal between the valve chamber and the power chamber of the motor. The sealing member of the valve may, as stated, partake of various forms, but, in any event, its seat, through the duct of which communication is had with the interior of the engine cylinder, is automatically impelled against the sealing member to compensate for wear between the parts and to assure a tight seal at all times. In some forms of engines, it may be desirable to mount the sealing member within a valve casing secured to the interior of the cylinder casting, after the general manner shown in Figures 5 and 7 of the drawings, but, ordinarily, the valve casing may be formed integral with the cylinder casting as shown in the construction illustrated in Figures 1 to 4 inclusive.

Figure 9:
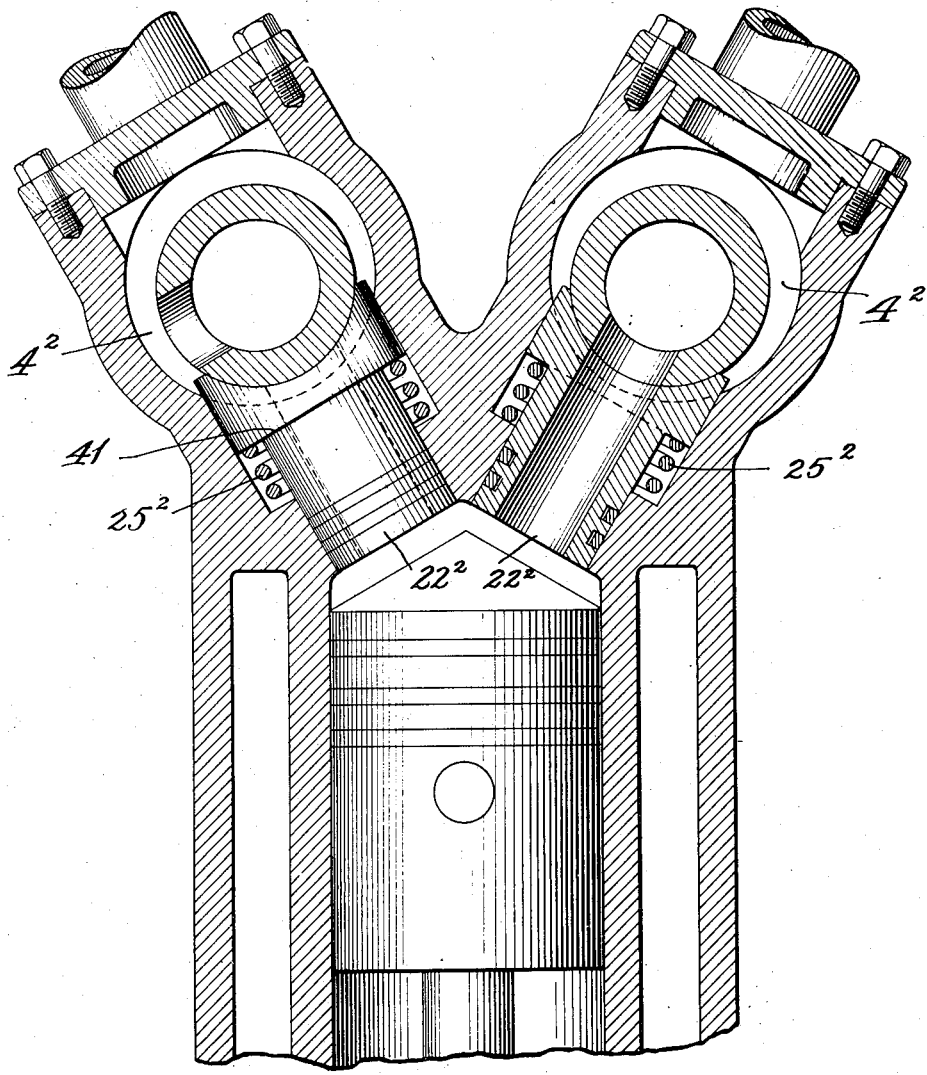
Figure 9 is a section on the line 9—9 of Figure 8, showing certain parts in elevation.

Referring now to Figures 8 and 9, a structure is shown which is constructed along the same general lines as the construction of Figures 3 and 4, but differs from the prior showing in that the channelled member or sleeve 22² is not counterbalanced by pistons as hereinbefore described. The sleeves 22² are mounted in passages 6² in the cylinder casting corresponding to the passages 6, but adjacent the interior of the chamber 4², which corresponds to the chamber 4, said passages are of increased area, so that a spring 25² may be used within the passages as shown in a position to surround the sleeves for a portion of their length and bear against shoulders 41, formed by making the end of each sleeve, which cooperates with the rotary barrel, of greater diameter than that portion which operates in the passages 6². Otherwise, the construction shown in Figures 8 and 9 is the same as disclosed in Figures 3 and 4. The balancing of the sleeves against the action of compression within the power chamber is not availed of in the construction of Figures 8 and 9, and the present invention is to be understood as capable of employment, either in conjunction with the balanced feature or without using the same.

Figure 10:
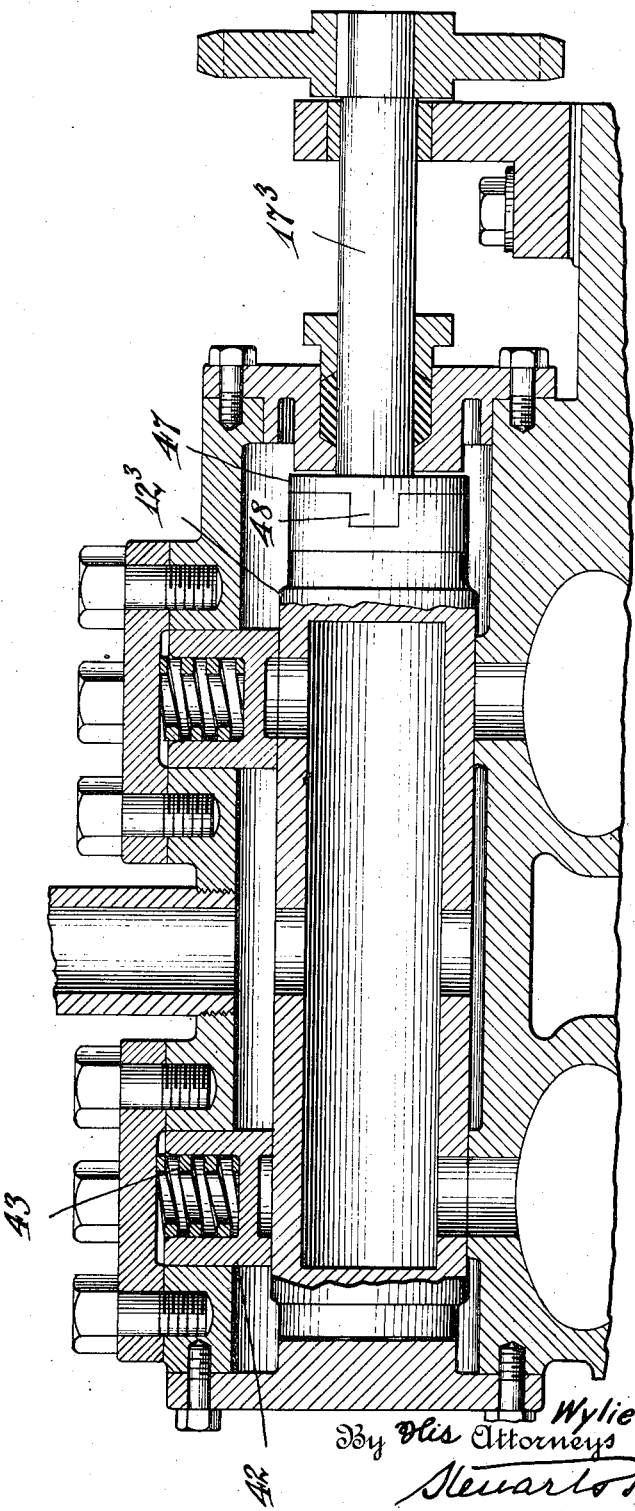
Figure 10 is a view corresponding to Figure 8, but illustrating a further modified form of valve arrangement.
Figure 11:
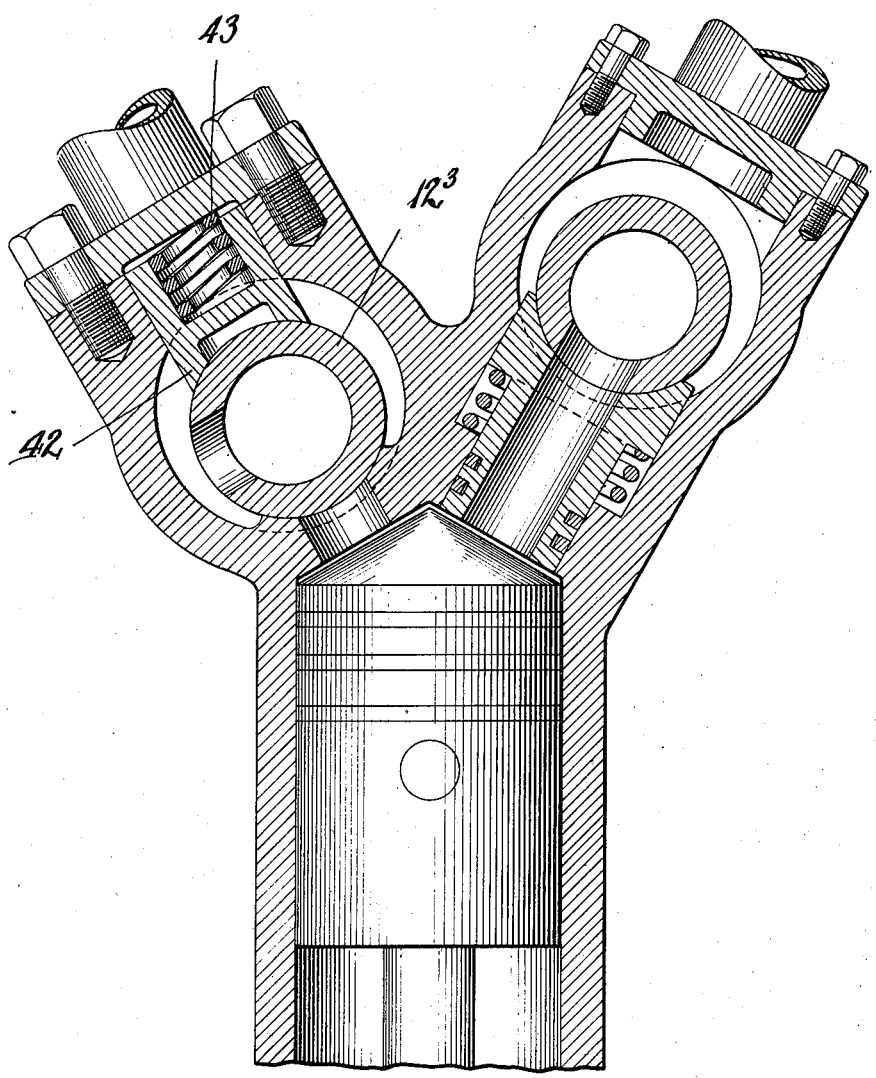

Referring now to Figures 10, 10ª and 11, it will appear that the construction therein shown differs in certain details of construction from any of the structures previously referred to. In these figures, an engine is illustrated which embodies a composite construction of the type of valve shown in Figures 8 and 9, and of a further modified form of the invention. In Figure 11, the valve at the right is of the type shown in Figures 8 and 9, but the valve at the left is of the type shown in Figures 10 and 10ª. This latter construction differs from the prior construction in that it embodies what may be generally termed a transposition of parts. In all of the structures hereinbefore described, the rotary sealing member is mounted for rotation on a fixed axis, and the valve seat is resiliently forced against the rotary sealing member. In the showing of Figure 10, the valve seat is rigid with the cylinder casting and may be formed by machining a part of the casting on the arc of a circle of the same radius as the radius of the rotary barrel, and the rotary barrel is resiliently forced to a seat against the valve seat. To this end, the rotary barrel 12³ is made so as to, figuratively speaking, float within the valve chamber and is held against its seats by means of spring pressed plungers 42. These spring pressed plungers 42 are mounted for sliding movement in pockets in the walls of the valve casing and are forced against the rotary barrel by means of springs 43, as clearly shown. These springs are of sufficient tension, not only to force the plungers 42 against the barrel, but to tightly hold the barrel to its seats at all times. As stated, the seats are curved on the same radius as the radius of the rotary barrel, and, as shown in Figure 11, the ends of the plungers 42 which cooperate with the barrel are similarly curved, so that the barrel is held between these curved faces of the valve seats and plungers and maintained at all times in cooperative relation with the valve seats.

The barrel is rotated from a stub shaft 17³, corresponding to the shaft 17, but, because of the floating character of the barrel a yieldable coupling is provided between the inner end of the stub shaft and the barrel. For the purpose of illustration, I have shown a coupling of the type frequently referred to as "Oldham's coupling," although any other form of universal joint or yieldable or flexible coupling may be utilized. In order that, however, the form of coupling illustrated may be clearly understood, I have shown in Figure 10ª details of the coupling. Interposed between the end of the barrel 12³ and the adjacent end of the shaft 17³ is an intermediate disk 44 with grooves 45 and 46 in its opposite face positioned at right angles to one another. The adjacent end of the barrel 12³ is provided with a rib adapted to enter one of these grooves and the adjacent end of the shaft 17³ is provided with a disk 47, having a rib 48 adapted to fit into the other groove. By this construction, the rotary barrel may be freely rotated from the stub shaft 17³ through a flexible coupling which will permit of proper conformity between the barrel and its seats. It is possible that the opposite end of the barrel might be also journalled through a similar form of coupling in the opposite end of the valve chamber, but, in practice, this is found to be entirely unessential and is preferably dispensed with for the reason that, when not employed, expensive machining and the possibility of leakage are overcome and stuffing boxes are not required.

While the form of construction shown in Figure 10 may be employed with internal combustion engines, it is of particular utility when used on steam engines or air compressors or in an engine in which the pressure of the operating fluid is practically equal to or greater than the pressure existing at any time in the power cylinder.

All the embodiment of the invention hereinbefore described and shown in the drawings are directed to a common purpose namely, to provide in a rotary valve a rotary sealing member, which cooperates with its seat in such manner that resilient coaction exists between them. In some forms of the invention, the seat is resiliently maintained in engagement with the rotary sealing member and in other forms the sealing member may be resiliently impelled against the seat. In all forms of the invention, however, the self adjustment between the sealing member and its seat and the automatic maintenance of the valve seal tight through long periods of use, clearly differentiate the present invention from all prior rotary valve constructions, wherein wear serves to destroy tight joints instead of increasing the efficiency of the seal. Moreover, in none of the constructions illustrated will temperature, resulting in expansion or contraction of the parts, affect the operation of the valves, which will remain tight at all times and will not be subject to excessive wear.

An engine embodying valve construction as described will run practically noiseless as regards the sounds invariably resulting from the use of poppet valves or other valves of the lifting type. Furthermore, the rotary valve engine may be operated at a higher speed than one embodying poppet valves and, accordingly, an engine constructed in accordance with this invention can be run at such a speed that a predetermined horse power can be obtained by a lighter engine than heretofore possible in existing engine construction. This is made possible not only by the rotary valve arrangement, but by the further important fact that the engine is not rendered inoperative when highly heated as is the case with other rotary valve engines now in use. The present invention is particularly adapted, in this respect, for use as motive power for aeroplanes where maximum power with minimum weight is desirable, and valve construction of the most desirable type is required.

It will be understood that the specific forms of the invention described may be modified in formal respects, such as by the substitution of equivalents, and that parts of the complete mechanism described may be used alone without necessarily employing them all, or that such parts may be used in other enviroments without departing from the spirit or substance of the broad invention, the scope of which is commensurate with the appended claims.

Having thus fully described the invention, what I claim as new and desire to secure by Letters Patent is:

1. In a structure of the class described, a power chamber having inlet and exhaust chambers communicable therewith, and with each of which latter chambers is associated a valve seat, a rotary sealing member operable within each of the intake and exhaust chambers and cooperating with the seat associated therewith, the sealing face of said rotary sealing members being free from engagement with the walls of the chambers in which they operate, and means for effecting continuous resilient coaction between each rotary sealing member and its cooperating seat.

2. In a structure of the class described, a power chamber having intake and exhaust chambers communicable therewith, and with each of which latter chambers is associated a valve seat, a barrel mounted to revolve in each of the intake and exhaust chambers and free from peripheral contact therewith and cooperating with the valve seats to control communication between the intake and exhaust chambers and the power chamber in timed sequence, means for effecting resilient coaction between the rotary barrels and their respective seats at all times, and means for rotating the rotary barrels.

3. In a structure of the class described, a power chamber having intake and exhaust chambers communicable therewith and with each of which latter chambers is associated a valve seat, a rotary barrel operable in each of the inlet and exhaust chambers and co-operating with the seat thereof to control communication between the intake and exhaust chamber and the power chamber in timed sequence, the operative faces of the rotary barrels being free from engagement with the walls of the chambers in which they operate, means for effecting resilient coaction between the rotary barrels and their seats at all times, and means for rotating the rotary barrels.

4. In a structure of the class described, a power chamber having intake and exhaust chambers communicable therewith and with each of which latter chambers is associated a valve seat, a floating rotary sealing member operable within each of the intake and exhaust chambers, free from engagement with the walls thereof, and adapted to cooperate with the valve seats to control communication between the intake and exhaust chambers and the power chamber in timed sequence, means for effecting resilient coaction between the rotary sealing members and their seats at all times, and means for rotating said sealing members.

5. In a structure of the class described, a power chamber having a passage in the wall thereof, a cylindrical member having its outer end formed in the arc of a circle, said cylindrical member being movably mounted within the passage, a piston operatively connected to such cylindrical member and movably mounted within a cavity formed in the wall of the power chamber opposite the cylindrical member, the superficial areas of the cylindrical member and piston, exposed to the pressure within the power chamber, being substantially the same, a cylindrical sealing member provided with a port adapted to register with the curved end of the cylindrical member, which sealing member is of such diameter as to correspond to the curved face of the cylindrical member with which it co-operates, means for causing the cylindrical member to bear on said sealing member with an elastic pressure, a valve casing housing the sealing member, and means for mounting the sealing member for rotation in the opposite walls of the casing, leaving the remaining parts of the sealing member free from contact with the casing, and a duct communicating with the interior of the valve casing.

6. In a structure of the class described, a power chamber having a passage leading therefrom to a valve chamber, in combination with a cylindrical member mounted for sliding movement within said passage, a piston operable in a pocket formed in the wall of the power chamber and connected with the cylindrical member, the exposed superficial areas of the piston and cylindrical member being substantially the same, a sealing member in the valve casing to cooperate with said cylindrical member, said sealing member having a port adapted to register with the cylindrical member to establish communication between the power chamber and the valve casing and a solid section to cut off such communication, means for actuating the sealing member to bring the port thereof into and out of registration with the cylindrical member, and means associated with the cylindrical member to cause the same to bear on the sealing member to effect a tight seal between the parts.

7. An internal combustion engine embodying a combustion chamber, a valve casing associated with the same and having a passage connecting said casing with the combustion chamber and a duct leading from said casing and serving as an engine supply or exhaust, in combination with a tubular member slidably mounted within the passage between the casing and combustion chamber and having the end thereof nearest to the valve casing, cut in the arc of a circle, means for counterbalancing the effect of the gas pressure within the combustion chamber upon the exposed superficial area of said tubular member, said means being subjected to substantially equal gas pressure as that to which the tubular member is exposed but in an opposite direction, a cylindrical sealing member mounted for rotation within the casing but out of contact therewith except at the points of its rotary bearings, said rotary sealing member being shaped to correspond to the curved end of the tubular member and being provided with a port adapted to be brought into and out of registration with the tubular member to alternately establish and cut off communication between the valve casing and the combustion chamber, and means for impelling the tubular member against the sealing member with an elastic pressure to effect a tight joint between them.

Signed by me at New York city, N. Y., this 27th day of February, 1920.

WYLIE GEMMEL WILSON.

Witnesses:
MAE E. LAMBE,
DOROTHY FRANK.